United States Patent
Han et al.

(10) Patent No.: US 12,000,754 B2
(45) Date of Patent: Jun. 4, 2024

(54) LOAD GENERATING UNIT FOR TESTING ACTUATOR AND LOAD SIMULATOR FOR TESTING ACTUATOR

(71) Applicant: AGENCY FOR DEFENSE DEVELOPMENT, Daejeon (KR)

(72) Inventors: Seung-Chul Han, Daejeon (KR); Ji-Suk Kim, Daejeon (KR); Ha-Jun Lee, Daejeon (KR); Dae-Gyeom Kang, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 100 days.

(21) Appl. No.: 17/707,775

(22) Filed: Mar. 29, 2022

(65) Prior Publication Data
US 2022/0316982 A1 Oct. 6, 2022

(30) Foreign Application Priority Data
Apr. 1, 2021 (KR) .................. 10-2021-0042797

(51) Int. Cl.
*G01M 13/02* (2019.01)
*G01M 99/00* (2011.01)

(52) U.S. Cl.
CPC .......... *G01M 13/02* (2013.01); *G01M 99/007* (2013.01)

(58) Field of Classification Search
CPC ..... G01N 3/38; H02K 49/108; G01M 13/027; G01M 99/007; G01M 13/02; F03G 7/087
See application file for complete search history.

(56) References Cited

U.S. PATENT DOCUMENTS

| 4,011,477 A | * | 3/1977 | Scholin | H02K 49/10 310/80 |
| 4,795,929 A | * | 1/1989 | Elgass | H02K 33/16 318/128 |

(Continued)

FOREIGN PATENT DOCUMENTS

| CN | 205785814 U | 12/2016 |
| CN | 110220698 B | 4/2020 |

(Continued)

OTHER PUBLICATIONS

KR-101297755_English Translation (Year: 2004).*

*Primary Examiner* — Tran M. Tran
(74) *Attorney, Agent, or Firm* — STIP Law Group, LLC

(57) ABSTRACT

The present invention provides a load generating unit for testing an actuator, the unit including a first permanent magnet and a second permanent magnet spaced apart from each other; a third permanent magnet or a ferromagnetic body arranged in a row with the first permanent magnet and the second permanent magnet between the first permanent magnet and the second permanent magnet; and a first link passing through central axes of the first permanent magnet and the second permanent magnet to be penetrated to a central axis of the third permanent magnet and be connected to the actuator, wherein the third permanent magnet and the link are displaced in a length direction of the first link by a magnetic force. According to the present invention, the complexity, cost, and inertia of a device may be overcome and a load profile may be easily generated.

9 Claims, 5 Drawing Sheets

(56) References Cited

U.S. PATENT DOCUMENTS

| | | | | |
|---|---|---|---|---|
| 6,441,517 B1* | 8/2002 | Brum | ............... | B26B 19/282 |
| | | | | 310/36 |
| 7,775,120 B2* | 8/2010 | Owens | ............... | G01M 99/007 |
| | | | | 73/777 |
| 8,072,302 B2* | 12/2011 | Liang | ............... | H10N 35/00 |
| | | | | 335/229 |
| 8,324,763 B2* | 12/2012 | Gosvener | ............... | H02K 7/075 |
| | | | | 310/23 |
| 8,487,484 B1* | 7/2013 | Miller, Jr. | ............... | H02K 7/06 |
| | | | | 310/15 |
| 8,508,089 B2* | 8/2013 | Edwards | ............... | H02K 49/10 |
| | | | | 310/80 |
| 8,786,141 B2* | 7/2014 | Wilson | ............... | H02K 49/102 |
| | | | | 310/12.01 |
| 10,491,092 B2* | 11/2019 | Rios-Quesada | ...... | H02K 11/215 |
| 11,018,569 B1* | 5/2021 | Herrin | ............... | H02K 41/06 |
| 11,204,081 B2* | 12/2021 | Ikeda | ............... | F16H 25/2204 |
| 11,619,564 B2* | 4/2023 | Ito | ............... | G01M 99/007 |
| | | | | 356/625 |
| 2018/0205303 A1* | 7/2018 | Del Curto | ............... | H02K 53/00 |

FOREIGN PATENT DOCUMENTS

| | | |
|---|---|---|
| KR | 100760138 B1 | 9/2007 |
| KR | 20100108876 A | 10/2010 |
| KR | 101297755 B1 | 8/2013 |

* cited by examiner

LOAD GENERATING UNIT FOR TESTING ACTUATOR AND LOAD SIMULATOR FOR TESTING ACTUATOR

CROSS REFERENCE TO RELATED APPLICATION

The present application claims priority to Korean Patent Application No. 10-2021-0042797 filed on Apr. 1, 2021, the entire contents of which is incorporated herein for all purposes by this reference.

BACKGROUND OF THE INVENTION

Field of the Invention

The present invention relates to a simulator for applying a load to an actuator and a load generating unit forming the simulator.

Description of the Related Art

An actuator is a mechanical device that moves according to a control command, and at this time, performance of the actuator in following the command varies depending on the force (load) applied from outside. A load profile represents the direction and magnitude of the load applied according to the displacement of the actuator and varies depending on the technical fields in which the actuator is used. Engineers designing the actuator need to predict the load profile suitable for the final application and check the performance changes of the actuator without fail when the profile is applied. A device that is connected to the actuator and simulates the load by applying a force is referred to as a 'load simulator'.

Different fields employ different actuators and have different load profiles, but, as illustrated in FIG. 1, a dominant profile is such that the 'direction of displacement movement' and the 'direction of load application' are opposite to each other in general. The profile is such that there is a specific point of no load and that, as movement is made from this point toward either end displacement, the movement of the actuator is resisted and the magnitude of the load gradually increases. For this purpose, conventionally, a load generating motor is directly connected (Korean Patent No. 10-1297755), a double-acting hydraulic cylinder is connected (Korean Patent Application No. 10-2010-0108876), or a leaf spring is connected (Korea Patent No. 10-1297755) as a load simulator.

However, the configuration of the device according to conventional technology is rather complex and costly. In addition, the conventional technology has a disadvantage in that it is difficult to generate a 'matching profile' in which the displacement movement direction and the load application direction match. That is, the magnitude of load gradually increases when the movement is made from the specific point of no load toward either end displacement.

In a rather uncommon technical field in which a load as illustrated by the profile in FIG. 2 is applied, for example, in a pintle actuator that serves as a nozzle opener/closer of a guided weapon and a spacecraft thruster, a load simulator configured to apply the profile in which 'displacement direction and load direction match' is a must.

If the load profile in FIG. 2 is to be generated based on the conventional technology, the system becomes more complicated and the cost further increases. In particular, there is a high possibility that not so small an amount of inertia is added to the actuator, which deteriorates the accuracy in the load simulation. A large increase in the actuator inertia will impact on the original following performance, and accurate determination of the actuator performance pursued by the designer may not be obtained.

The matters described above in the technical background are intended only for a better understanding of the background of the present invention and may include matters other than the conventional technology already known to those with common knowledge in the field to which the present invention pertains.

SUMMARY OF THE INVENTION

An object of the present invention is to provide a load generating unit for testing an actuator and a load simulator for testing the actuator by which a load profile may be easily generated by overcoming the complexity, costliness, and inertia of the apparatus.

A load generating unit for testing an actuator according to an aspect of the present invention includes a first permanent magnet and a second permanent magnet spaced apart from each other; a third permanent magnet arranged in a row with the first permanent magnet and the second permanent magnet between the first permanent magnet and the second permanent magnet; and a first link passing through central axes of the first permanent magnet and the second permanent magnet to be penetrated to a central axis of the third permanent magnet and be connected to the actuator, wherein the third permanent magnet and the link are displaced in the length direction of the first link by a magnetic force.

The polarities of either surface of the third permanent magnet differ from the polarities of the surfaces of the first and second permanent magnets respectively facing either surface of the third permanent magnet.

Alternatively, the polarities of either surface of the third permanent magnet are the same as the polarities of the surfaces of the first and second permanent magnets respectively facing either surface of the third permanent magnet.

The first permanent magnet, the second permanent magnet, and the third permanent magnet have a rectangular planar shape or a cylindrical shape.

A load generating unit for testing an actuator according to another aspect of the present invention includes a first permanent magnet and a second permanent magnet fixedly spaced apart from each other; a ferromagnetic body arranged in a row with the first permanent magnet and the second permanent magnet between the first permanent magnet and the second permanent magnet; and a first link passing through central axes of the first permanent magnet and the second permanent magnet to be penetrated to a central axis of the ferromagnetic body and be connected to the actuator, wherein the ferromagnetic body and the link are displaced in the length direction of the first link by a magnetic force.

The polarities of the surfaces of the first and second permanent magnets respectively facing either surface of the ferromagnetic body differ from each other.

Alternatively, the polarities of the surfaces of the first and second permanent magnets respectively facing either surface of the ferromagnetic body are the same.

The first permanent magnet, the second permanent magnet, and the ferromagnetic body have a rectangular planar shape or a cylindrical shape.

Next, the load simulator for testing an actuator according to an aspect of the present invention includes the load generating unit and the actuator directly connected to the first link.

A first bracket coupled to the other surface of the first permanent magnet, a second bracket coupled to the other surface of the second permanent magnet, and a permanent magnet displacement adjusting unit coupled to the first bracket to adjust the position of the first bracket may be further included.

Here, the first bracket and the second bracket are ferromagnetic.

A load simulator for testing an actuator according to still another aspect of the present invention includes the load generating unit; a second link arranged parallel to the first link, one end of the second link being connected to the actuator; and a moment arm of which one end is rotatably coupled to the first link and the other end is rotatably coupled to the second link, wherein the moment arm rotates around a middle portion of the moment arm.

A fixed moment aim bracket and a coupling pin passing through the moment arm bracket and a middle portion of the moment arm to be coupled thereto may be further included.

Further, a first bracket coupled to the other surface of the first permanent magnet; a second bracket coupled to the other surface of the second permanent bracket; and a permanent magnet displacement adjusting unit coupled to the first bracket to adjust the position of the first bracket may be further included.

Here, the first bracket and the second bracket are ferromagnetic.

According to the load generating unit and the load simulator for testing the actuator, a system having a linear relationship between displacement and load with respect to the neutral position of the actuator may be simulated. In particular, a more useful application is possible when the external load depending on the position of the actuator has a profile as illustrated in FIG. 2.

For example, in the case of a thruster driving system for controlling missile attitude and trajectory, the actuator performance needs to be checked through high-cost, high-risk tests such as a combustion test or a pneumatic test unless the load simulator of the present invention is used.

However, using the load simulator of the present invention may significantly reduce the test cost and risk. Further, a method of directly connecting a load generating motor and a method of connecting a double-acting hydraulic cylinder for arbitrarily generating the actuator load profile have been developed, but the load profile in FIG. 2 may be simulated using a configuration of permanent magnets and a link only so that the system may be configured much more concisely in a different manner.

Further, configuring the load simulator with a structure of a spring, link, and joint to obtain the same load profile often increases the equivalent inertia of the actuator unnecessarily. On the other hand, the load simulator of the present invention uses the force generated by the permanent magnets so that a test device may be configured to minimize the impact on the equivalent inertia of the actuator while simulating the desired load.

The present invention having several advantages as described above is expected to be widely used in the development of various thruster driving devices in which similar types of loads act.

DETAILED DESCRIPTION OF THE INVENTION

Reference is to be made to the accompanying drawings illustrating preferred embodiments of the present invention and the content described in the accompanying drawings in order to fully understand the present invention, operational advantages of the present invention, and the objects achieved by the embodiments of the present invention.

Already known techniques or repetitive descriptions that may unnecessarily obscure the gist of the present invention will be cut short or omitted.

Figure 5:
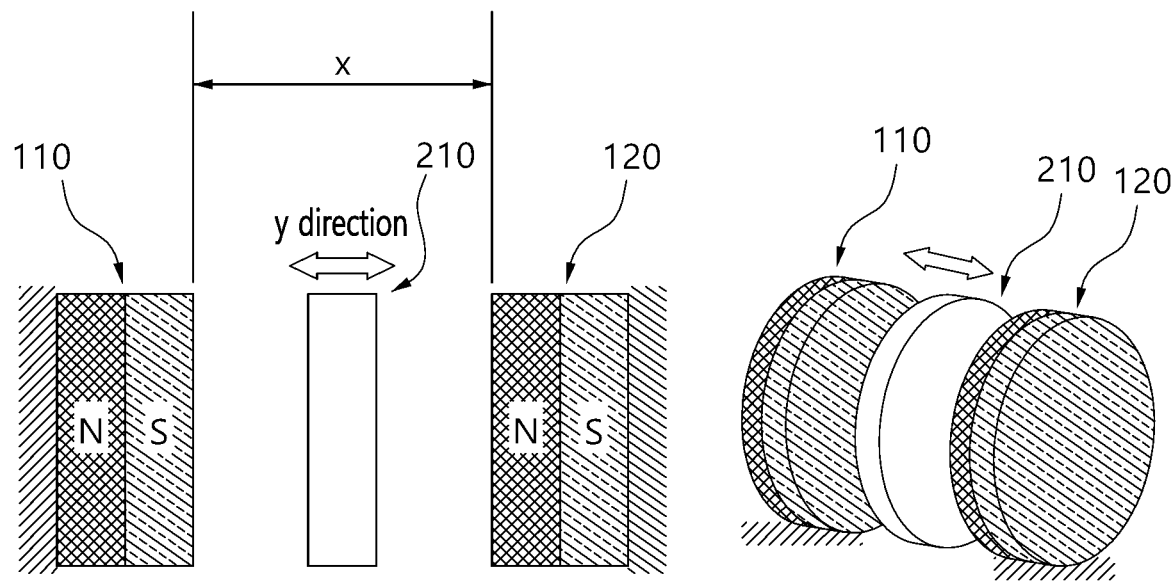
Figure 6:
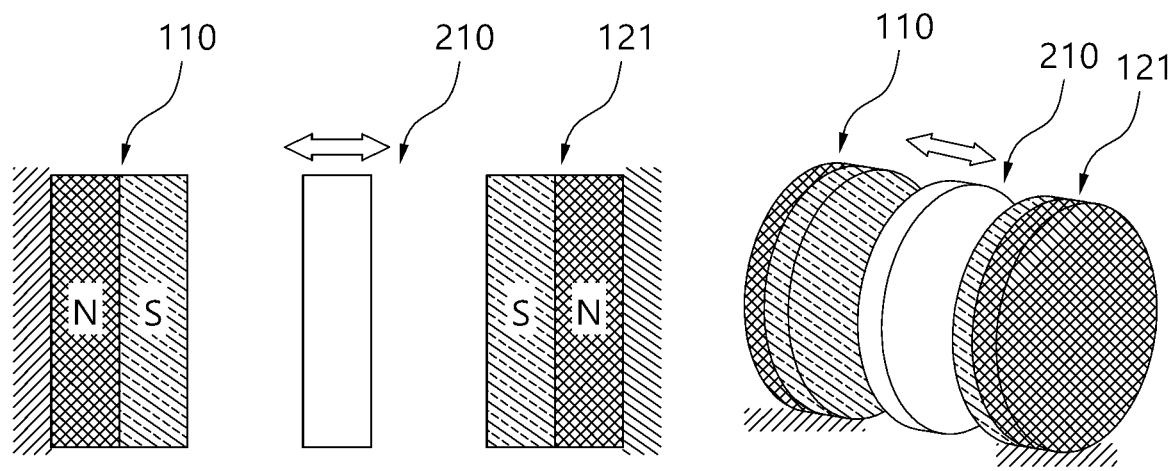
Figure 7:
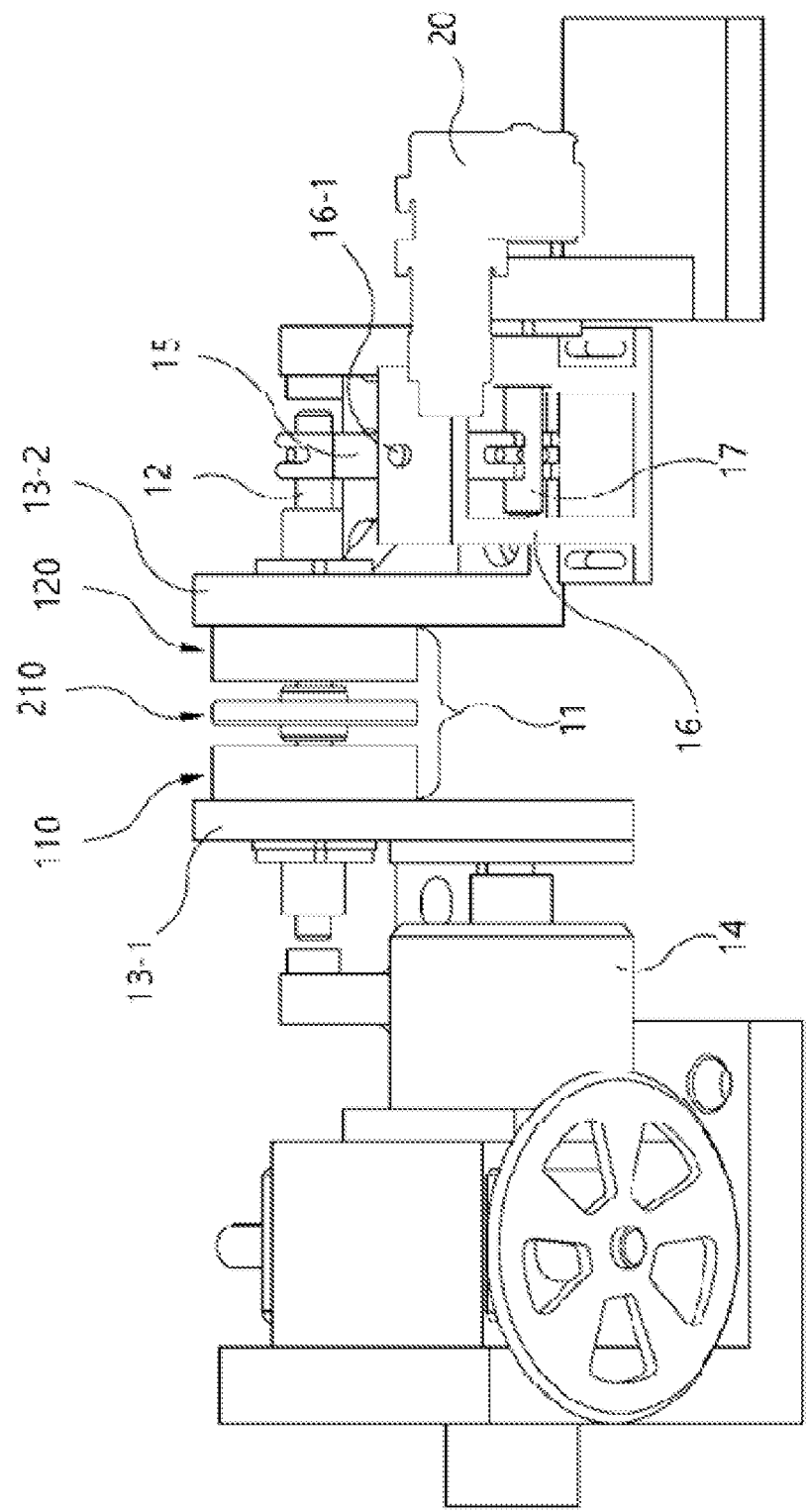
FIG. 7 illustrates an embodiment of a load simulator for testing an actuator of the present invention.

FIGS. 3 to 6 illustrate various embodiments of a load generating unit for testing an actuator of the present invention, and FIG. 7 illustrates an embodiment of a load simulator for testing an actuator of the present invention.

Hereinafter, a load generating unit for testing an actuator and a load simulator for testing the actuator according to embodiments of the present invention will be described with reference to FIGS. 3 to 7.

The present invention relates to a load generating unit for testing an actuator and a load simulator for testing the actuator configured to overcome the complexity, costliness, and inertia of the device and easily generate a load profile.

To this end, the present invention simulates a load using a magnetic force by arranging permanent magnets and a ferromagnetic body.

That is, a plurality of permanent magnets or a plurality of permanent magnets and a ferromagnetic body such as iron or nickel are arranged in series/in a row, and a load is simulated using a magnetic force interacting between the respective components.

The load generating unit of the present invention includes a pair of fixed permanent magnets and includes at least one permanent magnet or a ferromagnetic body disposed therebetween.

FIGS. 3 to 6 describe with examples a most basic load generating unit including three permanent magnets or two permanent magnets and a ferromagnetic body.

Figure 3:
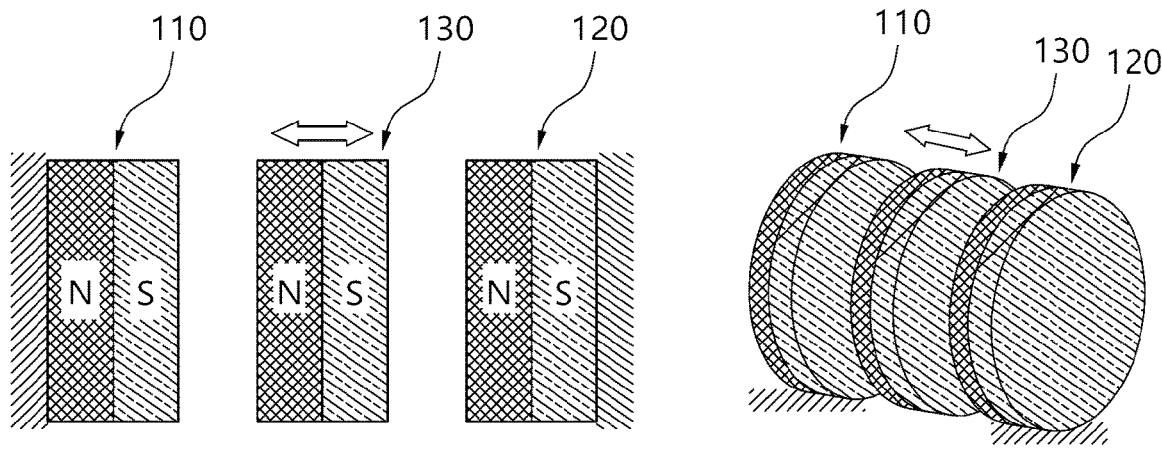
FIG. 3, FIG. 4, FIG. 5 and FIG. 6 illustrate various embodiments of a load generating unit for testing an actuator of the present invention.

The load generating unit according to a first embodiment in FIG. 3 includes a first permanent magnet 110, a second permanent magnet 120, and a third permanent magnet 130 arranged in a row, wherein the third permanent magnet 130 is disposed between the first permanent magnet 110 and the second permanent magnet 120 fixedly spaced apart from each other.

The first permanent magnet 110, the second permanent magnet 120, and the third permanent magnet 130 have a rectangular planar shape or a cylindrical or hollow cylindrical shape magnetized in the axial direction.

Accordingly, the third permanent magnet 130 disposed between the fixed first permanent magnet 110 and the second permanent magnet 120 is displaced in the central axis direction by a magnetic force.

A link to be described below passes through, and is penetrated to, the first permanent magnet 110, the second permanent magnet 120, and the third permanent magnet 130, and the actuator is connected to the link so that the magnetic force by the magnets acts as a load on the actuator.

The polarities of the N and S poles of the first permanent magnet 110, the second permanent magnet 120, and the third permanent magnet 130 are arranged in the same direction as illustrated so that the third permanent magnet 130 is displaced by the act of an attractive force between the first permanent magnet 110 and the second permanent magnet 120.

Figure 4:
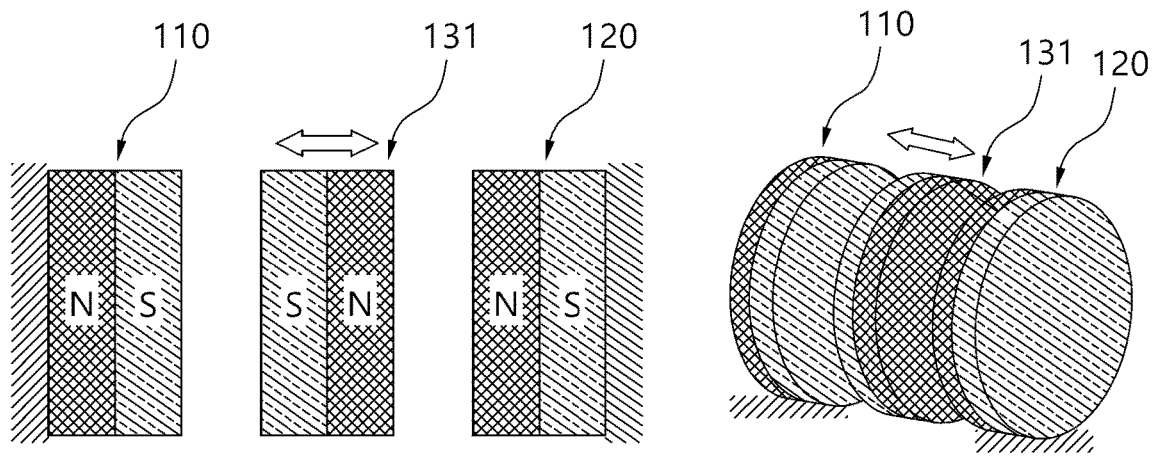

According to a second embodiment in FIG. 4, the third permanent magnet 131 is disposed such that the polarities of either surface facing the first permanent magnet 110 and the second permanent magnet 120 are the same as the polarities of the respective surfaces of the first permanent magnet 110 and the second permanent magnet 120 so that the third permanent magnet 131 is displaced by an act of a repulsive force between the first permanent magnet 110 and the second permanent magnet 120.

On the other hand, in third and fourth embodiments in FIGS. 5 and 6, a ferromagnetic body 210 instead of the third permanent magnet is arranged between the first permanent magnet 110 and the second permanent magnet 120.

FIGS. 5 and 6 exemplify cases where the polarity directions of the second permanent magnet 120, 121 are reversed, and a ferromagnetic body 210 is magnetized to match the magnetic direction between the first permanent magnet 110 and the second permanent magnet 120, 121 and is displaced.

FIG. 7 illustrates a load simulator to which the above load generating unit 11 is applied.

The load simulator includes the load generating unit 11, a first link 12, a first bracket 13-1, a second bracket 13-2, and a permanent magnet displacement adjusting unit 14 and may further include a moment arm 15, a moment arm bracket 16, a coupling pin 16-1, and a second link 17.

A plurality of permanent magnets or a plurality of permanent magnets and a ferromagnetic body of the load generating unit according to the first to fourth embodiments described above are arranged in series/in a row in the load generating unit 11, and a first permanent magnet 110, a second permanent magnet 120, and a ferromagnetic body 210 according to a fifth embodiment are arranged in FIG. 7.

Here, the first permanent magnet 110 and the second permanent magnet 120 may be axially magnetized ring magnets, and a disc-shaped ferromagnetic body 210 is arranged between the first permanent magnet 110 and the second permanent magnet 120.

The first link 12 passes through, and is coupled to, central axes of the first permanent magnet 110, the second permanent magnet 120, and the ferromagnetic body 210 of the load generating unit 11 to transfer the load to the actuator 20.

The first link 12, in a circular shape, passes through the central axes of the first permanent magnet 110 and the second permanent magnet 120 and may pass through the ferromagnetic body 210 as illustrated.

The first permanent magnet 110 and the second permanent magnet 120 are fixedly coupled to the first bracket 13-1 and the second bracket 13-2 respectively.

The fixed first permanent magnet 110, the second permanent magnet 120, and the first link 12 are preferably set such that friction therebetween is negligible.

The first bracket 13-1 and the second bracket 13-2 may be composed of a ferromagnetic body so that the permanent magnets are magnetically coupled thereto to do without fastening parts.

The first bracket 13-1 may be coupled to the permanent magnet displacement adjusting unit 14. That is, the first bracket 13-1 is displaced in the central axis direction as the permanent magnet displacement adjusting unit 14 that may be a hydraulic cylinder or a jackscrew, expands or relaxes so that the position of the first permanent magnet 110 may be finely adjusted in the central axis direction.

Accordingly, the load profile received from the load generating unit 11 may be adjusted.

In this way, the ferromagnetic body 210 disposed between the fixed first permanent magnet 110 and the second permanent magnet 120 is displaced in the axial direction parallel to the first link 12 by magnetic force and the first link 12 coupled to the ferromagnetic body 210 is displaced in the length direction so that the load is transferred to the actuator 20 by the generated displacement in the load simulator of the present invention.

On the other hand, the moment arm 15 and the second link 17 may be further included for adjusting a relationship between the displacement of the actuator 20 and load, the actuator 20 may be coupled to one end of the second link 17, and the actuator 20 may be directly connected to the first link 12 as needed.

One end of the moment arm 15 is rotatably coupled to the first link 12 and the other end is rotatably coupled to the second link 17.

The moment arm bracket 16 is included for fixing the moment arm 15, and the coupling pin 16-1 passes through, and is coupled to, the moment arm bracket 16 and an arbitrary middle portion of the moment arm 15.

Accordingly, when the first link 12 is displaced in the length direction, the moment arm 15 is rotated around the coupling pin 16-1 so that the second link 17 is displaced in the length direction.

The second link 17 may be parallel to the first link 12 and is adjusted by the moment arm 15 to be displaced in a greater magnitude so that a load of a greater magnitude is transferred to the actuator 20 coupled to one end of the second link 17.

An analysis of the load simulated by the load generating unit 11 is as follows. When the first permanent magnet 110, the second permanent magnet 120, and the third permanent magnet 130 are arranged in a row as illustrated in FIG. 3, the load applied to the third permanent magnet 130 connected to the actuator 20 is calculated by the following formula.

$$F(x) = \frac{\pi\mu_o M^2 R^4}{4}\left[\frac{1}{x^2} + \frac{1}{(x+2h)^2} - \frac{2}{(x+h)^2}\right], \quad \text{[formula 1]}$$

where
$\mu_o$: magnetic permeability of vacuum $4\pi\times10^{-7}$ TmA$^{-1}$
M: magnetization of a magnet
x: distance between two magnets
h: thickness (or height) of a magnet
R: radius of a magnet The force $F_1$ received by the first permanent magnet 110 and the force $F_2$ received by the second permanent magnet 120 when the third permanent magnet 130 moves by y may be calculated by the following formula.

$$F_1(x, y) = K\left[\frac{1}{(x-y)^2} + \frac{1}{(x-y+2h)^2} - \frac{2}{(x-y+h)^2}\right] \quad \text{(formula 2)}$$

$$F_2(x, y) = K\left[\frac{1}{(x+y)^2} + \frac{1}{(x+y+2h)^2} - \frac{2}{(x+y+h)^2}\right]$$

$$K = \frac{\pi\mu_o M^2 R^4}{4}$$

Figure 1:
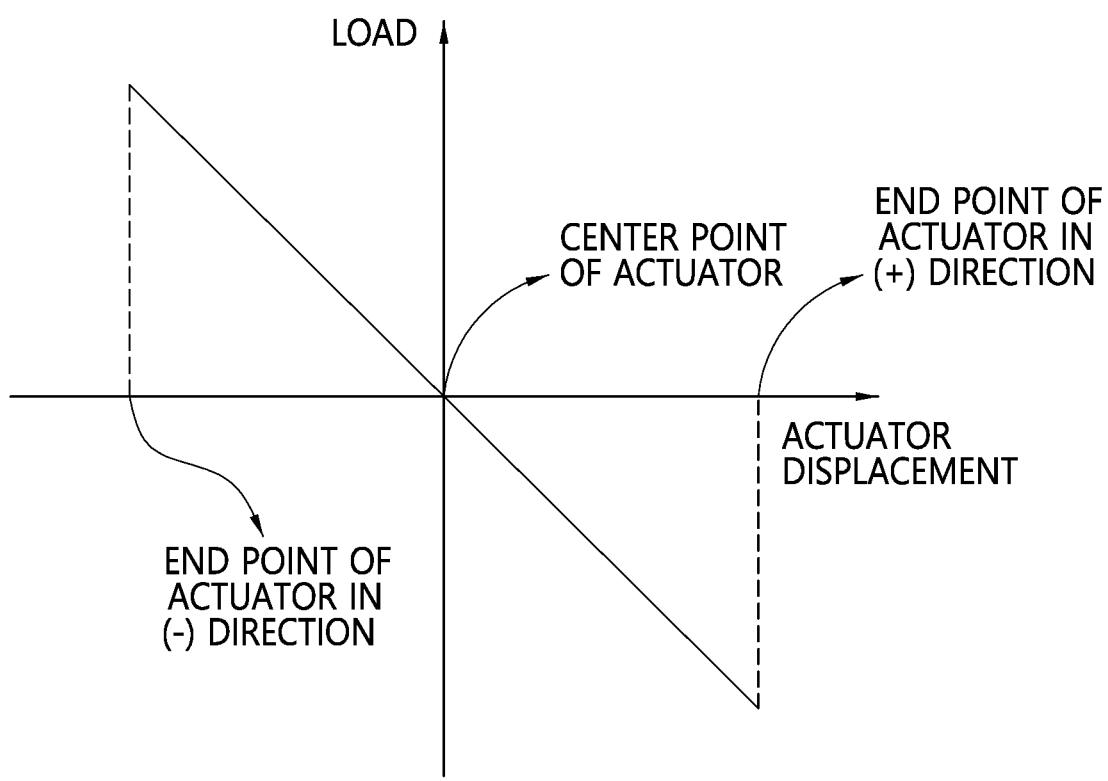
FIG. 1 and FIG. 2 illustrate examples of load profiles.
Figure 2:
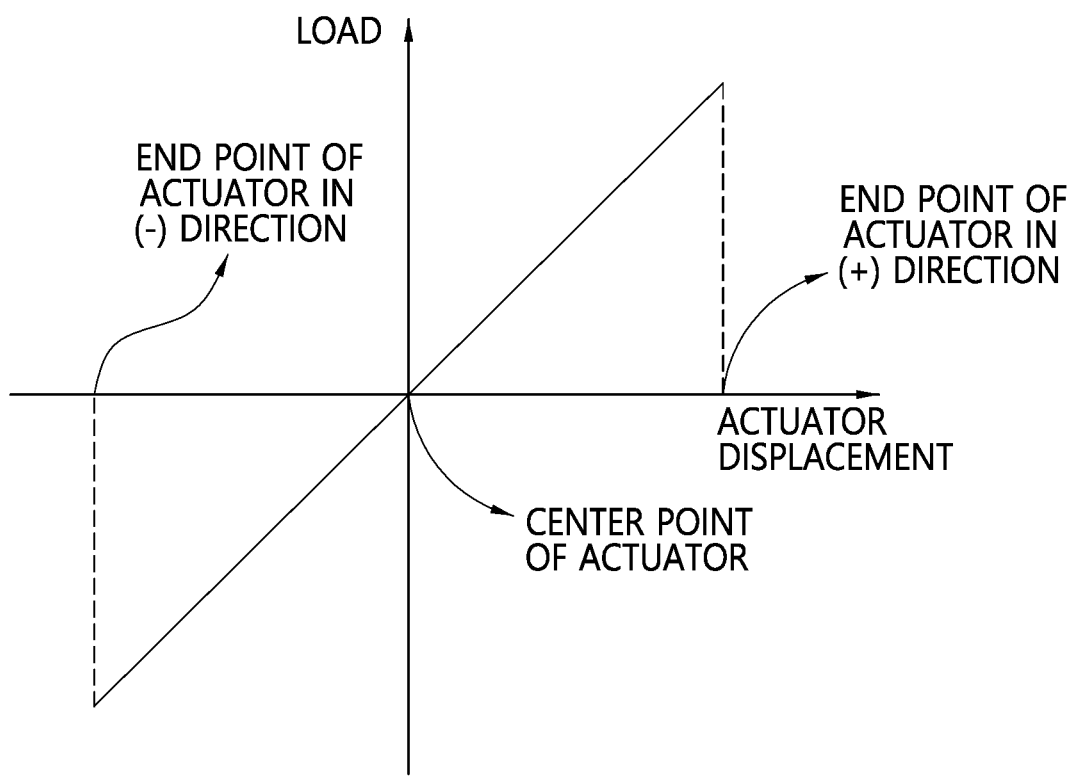

The load profile in FIG. 2 is generated when the final force $F_{net}=F_1-F_2$ received by the third permanent magnet 130 is plotted with respect to the magnitude of movement y. However, since the force changes in a nonlinear manner according to the displacement as the fixed first permanent magnet 110 or second permanent magnet 120 is approached, a linear magnet of proper size needs to be properly disposed for the operation of the load simulator in a linear interval.

The present invention may calculate the load by sensing the displacements of the third permanent magnet and the actuator linked in such a manner and may also measure the behavior of the actuator caused by the load.

Furthermore, after replacing the actuator with a load cell, adjusting the third permanent magnet, measuring the load on the load cell, checking the load profile as shown in FIG. 2, and it is possible to calibrate or configure the simulator before the simulation to match the desired load profile.

The present invention is described with reference to the illustrated drawings but is not limited to the described embodiments, and it will be self-evident to those skilled in the art that various revisions and modifications may be made without departing from the spirit and scope of the present invention. Accordingly, such revisions and modifications are to belong to the claims of the present invention, and the scope of rights of the present invention is to be interpreted based on the appended claims.

| DESCRIPTION OF REFERENCE NUMERALS | |
|---|---|
| 110: | first permanent magnet |
| 120, 121: | second permanent magnet |
| 130, 131: | third permanent magnet |
| 210: | ferromagnetic body |
| 11: | load generating unit |
| 12: | first link |
| 13-1: | first bracket 13-2: second bracket |
| 14: | permanent magnet displacement adjusting unit |
| 15: | moment arm |
| 16: | moment arm bracket 16-1: coupling pin |
| 17: | second link |
| 20: | actuator |

What is claimed is:

1. A load simulator for testing an actuator, comprising:
a first permanent magnet and a second permanent magnet spaced apart from each other;
a third permanent magnet arranged in a row with the first permanent magnet and the second permanent magnet between the first permanent magnet and the second permanent magnet; and
a first link passing through central axes of the first permanent magnet and the second permanent magnet to be penetrated to a central axis of the third permanent magnet and be connected to the actuator,
wherein the third permanent magnet and the link are displaced in a length direction of the first link by a magnetic force,
further comprising:
a second link disposed parallel to the first link, one end of the second link being connected to the actuator; and
a moment arm of which one end is rotatably coupled to the first link and the other end is rotatably coupled to the second link,
wherein the moment arm rotates around a middle portion of the moment arm,
wherein a displacement of the second link is increased than a displacement of the first link due to a rotational operation of the moment arm.

2. The load simulator of claim 1, wherein the polarities of either surface of the third permanent magnet differ from the polarities of surfaces of the first and second permanent magnets respectively facing either surface of the third permanent magnet.

3. The load simulator of claim 1, wherein the polarities of either surface of the third permanent magnet are the same as the polarities of surfaces of the first second permanent magnet respectively facing either surface of the third permanent magnet.

4. The load simulator of claim 1, wherein the first permanent magnet, the second permanent magnet, and the third permanent magnet have a rectangular planar shape or a cylindrical shape.

5. The load simulator of claim 1, further comprising:
a first bracket coupled to the other surface of the first permanent magnet;
a second bracket coupled to the other surface of the second permanent magnet; and
a permanent magnet displacement adjusting unit coupled to the first bracket to adjust a position of the first bracket.

6. The load simulator of claim 5, wherein the first bracket and the second bracket are ferromagnetic.

7. The load simulator of claim 1, further comprising:
a fixed moment arm bracket; and
a coupling pin passing through the moment arm bracket and a middle portion of the moment arm to be coupled thereto.

8. The load simulator of claim 7, further comprising:
a first bracket coupled to the other surface of the first permanent magnet;
a second bracket coupled to the other surface of the second permanent magnet; and
a permanent magnet displacement adjusting unit coupled to the first bracket to adjust a position of the first bracket.

9. The load simulator of claim 8, wherein the first bracket and the second bracket are ferromagnetic.

* * * * *